(12) United States Patent
Coombs

(10) Patent No.: US 11,625,821 B2
(45) Date of Patent: Apr. 11, 2023

(54) AUTOMATED INSPECTION-PLAN BASED DETECTION

(71) Applicant: Baker Hughes Oilfield Operations LLC, Houston, TX (US)

(72) Inventor: Kevin Andrew Coombs, Syracuse, NY (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 255 days.

(21) Appl. No.: 17/070,447

(22) Filed: Oct. 14, 2020

(65) Prior Publication Data

US 2022/0113697 A1 Apr. 14, 2022

(51) Int. Cl.
*G05B 13/04* (2006.01)
*G06T 7/00* (2017.01)
*G05B 19/406* (2006.01)
*G06Q 10/0639* (2023.01)
*G06Q 10/10* (2023.01)
(Continued)

(52) U.S. Cl.
CPC ............ *G06T 7/0004* (2013.01); *G05B 13/04* (2013.01); *G05B 13/044* (2013.01); *G05B 19/406* (2013.01); *G06N 20/00* (2019.01); *G06Q 10/06395* (2013.01); *G06Q 10/10* (2013.01); *G05B 2219/31304* (2013.01); *G06Q 10/06316* (2013.01); *G06T 2207/20081* (2013.01)

(58) Field of Classification Search
CPC ............ G01R 31/2894; H04L 41/0663; G06N 5/048; G06N 20/00; B25J 9/102; G06Q 10/06395; G06Q 10/10; G06T 7/0004
See application file for complete search history.

(56) References Cited

U.S. PATENT DOCUMENTS

| 2003/0130806 A1* | 7/2003 | Mizuno | G01R 31/2894 |
| | | | 702/35 |
| 2012/0082027 A1* | 4/2012 | Kruglick | H04L 41/0663 |
| | | | 370/252 |

(Continued)

OTHER PUBLICATIONS

Zhang et al, CN 106251420, "Power Device Inspection System" (translation), Jul. 20, 2018, 8 pgs <CN_106251420.pdf>.*

(Continued)

*Primary Examiner* — Tuan A Vu
(74) *Attorney, Agent, or Firm* — Mintz Levin Cohn Ferris Glovsky and Popeo, P.C.

(57) ABSTRACT

An inspection-plan based inspection method includes receiving data characterizing an inspection plan associated with inspection of one or more nodes in an inspection site by an inspection device. A first step of the inspection plan includes a first set of operating parameters of the inspection device associated with the inspection of a first node of the one or more nodes and a first set of constraints associated with one or more inspection criteria at the first node by the inspection device. The method also includes generating a first control signal configured to instruct the inspection device to inspect the first node of the one or more nodes. The first control signal is based on one or more of the first set of operating parameters and a user input. The method further includes receiving data characterizing the inspection measurement of the first node by the inspection device.

20 Claims, 3 Drawing Sheets

(51) Int. Cl.
*G06N 20/00* (2019.01)
*G06Q 10/0631* (2023.01)

(56) References Cited

U.S. PATENT DOCUMENTS

2020/0254615 A1\* 8/2020 Bryner ..................... B25J 9/102
2020/0265329 A1\* 8/2020 Thomsen ............... G06N 5/048

OTHER PUBLICATIONS

International Search Report and Written Opinion received for PCT Application No. PCT/US2021/071812, dated Jan. 7, 2022, 10 pages.

\* cited by examiner

AUTOMATED INSPECTION-PLAN BASED DETECTION

BACKGROUND

Video inspection devices, such as video endoscopes or borescopes, can be used to take depth measurements on an object (e.g., lowest points in anomalies such as pits or dents, heights of welds, measurements of offsets or clearances between surfaces, etc.). Additionally, video inspection devices can be used to observe defects (e.g., tears, cracks, scratches, etc.) on a surface of an object (e.g., an industrial machine). In many instances, the surface of the object is inaccessible and cannot be viewed without the use of the video inspection device. For example, a video inspection device can be used to inspect the surface of a blade of a turbine engine on an aircraft or power generation unit to identify any anomalies to determine if any repair or further maintenance is required.

SUMMARY

Various aspects of the disclosed subject matter may provide one or more of the following capabilities.

In one implementation, a method of inspection-plan based inspection includes receiving data characterizing an inspection plan associated with inspection of one or more nodes in an inspection site by an inspection device. A first step of the inspection plan includes a first set of operating parameters of the inspection device associated with the inspection of a first node of the one or more nodes and a first set of constraints associated with one or more inspection criteria at the first node by the inspection device. The method also includes generating a first control signal configured to instruct the inspection device to inspect the first node of the one or more nodes. The first control signal is based on one or more of the first set of operating parameters and a user input. The method further includes receiving data characterizing the inspection measurement of the first node by the inspection device; and determining, by a first analytical model, one or more characteristics of the received data characterizing the inspection measurement of the first node. A next operation of the inspection device is based on correlation between the determined one or more characteristics of the received data with the first set of constraints.

One or more of the following features can be included in any feasible combination.

In one implementation, determining one or more characteristics includes identifying one or more of a site feature in the first node, a surrounding region associated with the first node, a machine part of the inspection site where the first node is located, and image acquisition parameters associated with the inspection measurement of the first node. In another implementation, the method further includes determining a defect type associated with the identified site feature; comparing the determined defect type with a constraint defect type in the first set of constraints; and determining the next operation of the inspection device based on the comparison. In yet another implementation, the method further includes generating a notification including the determined next operation. The notification includes one or more of an indication that the inspection of the first node is successfully completed or repeating inspection of the first node, and an inspection summary. The inspection summary includes one or more of the determined one or more characteristics, the first set of operating parameters and the first set of constraints.

In one implementation, the method further includes determining, an updated set of operating parameters for the inspection device associated with the inspection of the first node. The determining is based on the comparison between the determined defect type and the constraint defect type. In another implementation, the method further includes generating a second control signal based on the updated set of operating parameters. The next operation of the inspection device is based on the second control signal. In yet another implementation, the method includes presenting the notification to a user; receiving an input from the user in response to the presented notification; and generating a second control signal based on the received input. The next operation of the inspection device is based on the second control signal.

In one implementation, the next operation of the inspection device includes execution of a second step of the inspection plan that includes a second set of operating parameters of the inspection device associated with the inspection of a second node of the one or more nodes and a second set of constraints associated with an inspection measurement at the second node by the inspection device. In another implementation, the method includes receiving data characterizing the inspection measurement of the second node by the inspection device; and determining, by one of the first analytical model and a second analytical model, one or more characteristics of the received data characterizing the inspection measurement of the second node. The next operation of the inspection device is based on correlation between the determined one or more characteristics of the received data and the second set of constraints. In yet another implementation, the first analytic model and the second analytic model are included in the inspection plan.

In one implementation, the first analytic model is trained prior to the determination of the correlation between the determined one or more characteristics of the received data and the second set of constraints. The training includes receiving training data associated with the first analytical model. The training data includes historical inputs and outputs of the first analytical model. The method further includes training, by a training model, the first analytical model based on one or more of the received training data, received data characterizing the inspection measurement and the inspection plan.

In one implementation, the method includes generating a data file including one or more of information associated with the site feature in the first node, the first analytical model, data characterizing the inspection of the first node and the first set of operating parameters. In another implementation, the method includes presenting the first step of the inspection plan to a user; and receiving user input from a user. The first control signal is generated based on the user input.

In one implementation, the first control signal is generated based on the first set of operating parameters in the first step of the inspection plan. In another implementation, the determined one or more characteristics includes a surrounding region associated with the first node. In yet another implementation, the first analytical model can be based on the first set of constraints.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

These and other capabilities of the disclosed subject matter will be more fully understood after a review of the following figures, detailed description, and claims.

BRIEF DESCRIPTION OF THE FIGURES

These and other features will be more readily understood from the following detailed description taken in conjunction with the accompanying drawings, in which.

DETAILED DESCRIPTION

Inspection devices (e.g., borescopes) are commonly employed to inspect industrial equipment (e.g., power generation equipment, oil and gas equipment, aircraft equipment, manufacturing equipment, and the like). Inspection by a borescope can be carried out based on an inspection plan (menu-driven inspection) that can be presented to a user via a graphical user interface (GUI) display space. The inspection plan can provide the user with a list of inspection locations (or nodes) on an inspection site (e.g., an industrial equipment), and allow the user to navigate through the inspection locations and acquire inspection data (e.g., images, videos, etc.). Menu-driven inspection does not analyze the inspection data and provide feedback to the user on the execution of the inspection and/or the quality of the data acquired during inspection. Reliance on a human to ensure that the acquired inspection data is of a desirable quality can be both inefficient and prone to error, especially when multiple (e.g., tens, hundreds, etc.) nodes need to be inspected. This application provides for improved methods and systems that can monitor the implementation of an inspection plan and ensure that the inspection measurement is desirable (e.g., based on predetermined criteria). In some implementations, notifications can be generated that can apprise the user with the characteristics associated with inspection data, and allow the user to make changes to the inspection plan (e.g., via a GUI). In some implementations, a recommendation for changes to the inspection plan can be provided to the user.

Inspection devices can include one or more cameras that can be navigated inside the industrial equipment to an inspection region and acquire inspection data (e.g., visible-light images, IR-images, videos, temperature, etc.). The acquired image data can be communicated to a computing device (e.g., a controller) that can store/process the data, present the data to a human operator, etc. Inspection region images are generally viewed and analyzed by human operators who rely on their experience in identifying site features (e.g., defects) and/or determining characteristics of the site features (e.g., the severity of the defects). This process can be slow, expensive and prone to error. Moreover, the identification/analysis of site features usually occurs after the inspection data has been taken. For example, if the inspection region image is undesirable (e.g., the site feature or a characteristic thereof cannot be identified/analyzed), a new inspection data may not be easily obtained. Therefore, it may be desirable to analyze the inspection data during the inspection, and configure the inspection device to acquire new inspection data if needed.

Figure 1:
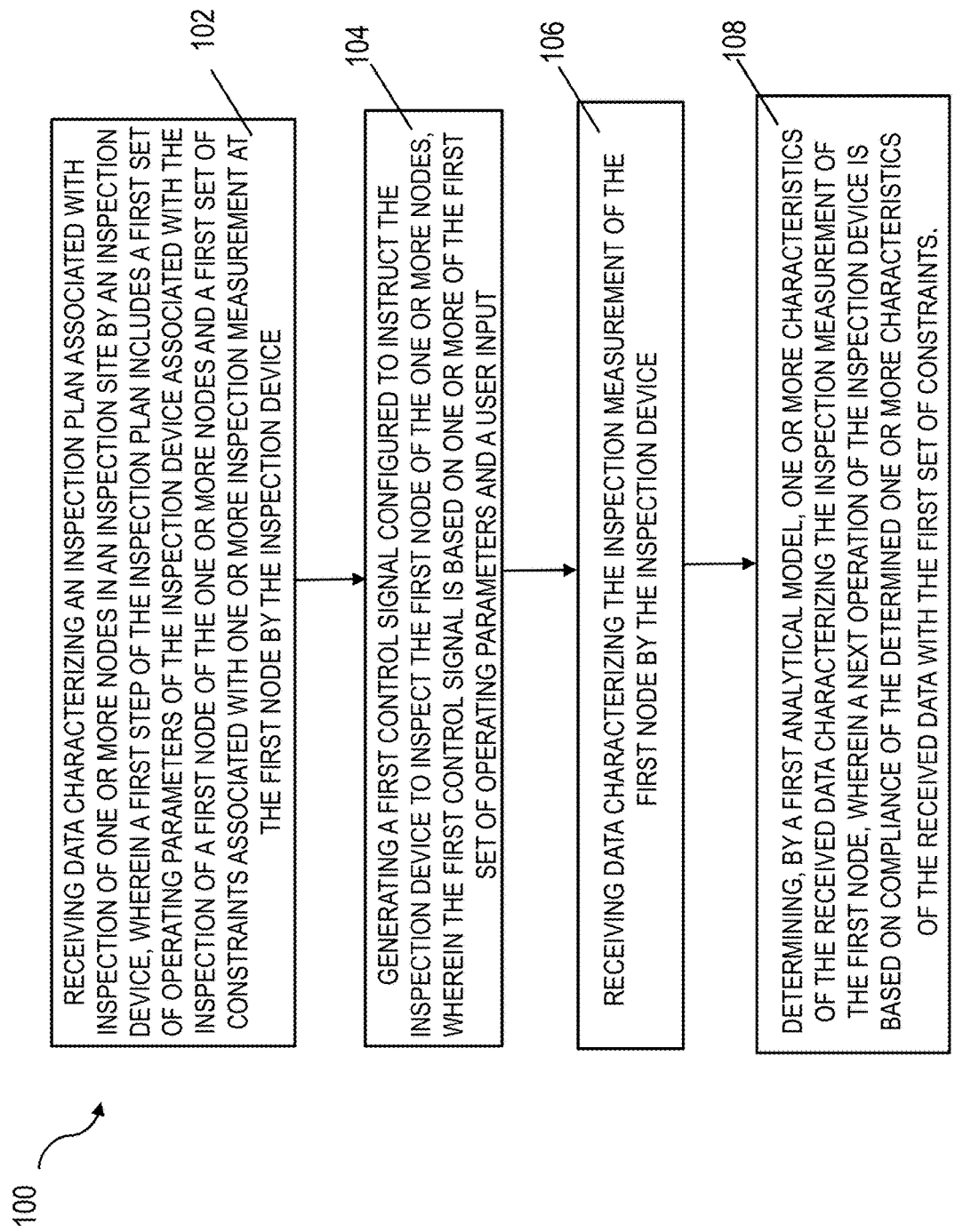
FIG. 1 illustrates a flowchart of an exemplary method for automated inspection of an inspection site (e.g., an industrial machinery)

FIG. 1 illustrates a flowchart of an exemplary method for inspecting an inspection site (e.g., an industrial machinery). At 102, data characterizing an inspection plan associated with inspection of one or more nodes of the inspection site is received (e.g., by a controller of the inspection device). The inspection plan can include a plurality of steps that can describe the inspection of the various nodes in the inspection site. In one implementation, each step of the plurality of steps can be associated with the inspection of a specific node (e.g., a machine part or a portion thereof) in the inspection site. For example, a first step of the inspection plan can include a first set of operating parameters of the inspection device for inspecting a first node in the inspection site. The operating parameters can include, for example, locations of nodes to be inspected, positions and articulation angles of camera(s) in the inspection device for the various nodes, arrangement of lighting device(s) during the capture of image(s) by the camera(s), the type of data to be captured (e.g., 2D image, 3D image, raw or compressed video, geometrically accurate image for dimensioning of features), etc. The inspection device can operate on the first set of operating parameters during the inspection of the first node.

The first step of the inspection plan can include a first set of constraints associated with one or more inspection measurements at the first node. For example, the first set of constraints can include expected properties of the inspection data. For example, constraints can include the type of defect (e.g., crack, tear, etc.) to be checked for at a machine part where the first node is located. Additionally or alternately, constraints can include an environment/a surrounding associated with the first node (e.g., a machine part on which the first node is located, a machine part adjacent to the first node, etc.). Additionally or alternately, constraints can be associated with the quality of the inspection measurement (e.g., quality of an image of the first node, image size of a site feature in the first node relative to the image of the first node, lighting of the first node, etc.)

Figure 2:
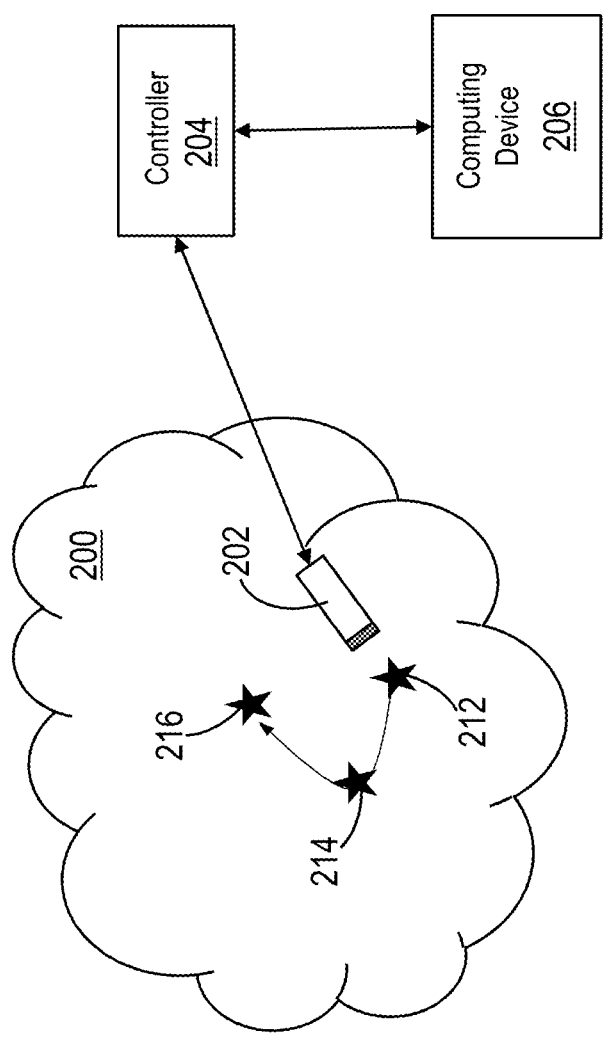
FIG. 2 illustrates an exemplary inspection device configured to inspect the inspection site.

FIG. 2 illustrates an exemplary inspection site 200 that can be inspected by an inspection device 202 (e.g., a borescope). The inspection device 202 can be communicatively coupled to a controller 204 that can control the operation of the inspection device 202. The controller can receive the inspection plan (e.g., as described at step 102 above). In one implementation, the controller 204 can receive the inspection plan from a computing device 206 and generate control signals that drive the operation of the inspection device 202. Based on the control signal, the inspection device can inspect the inspection site 200. For example, the inspection device can travel relative to the inspection site 200 and inspect nodes 212, 214 and 216 (e.g., along a predetermined path based on the inspection plan). The controller 204 can also receive inspection data from the inspection device 202. The inspection data can be presented on a display screen on the controller 204, or can be transmitted to the computing device 206 (where it can be delayed and/or analyzed).

Returning to FIG. 1, at step 104, a first control signal configured to instruct the inspection device (e.g., inspection device 202) to inspect the first node (e.g., node 212, 214, 216, etc.) of the one or more nodes can be generated (e.g., by the controller 204). In one implementation, the first control signal can be generated based on a user input (e.g., provided via the computing device 206, via a GUI in the controller 204, etc.). For example, the first step of the inspection plan can be presented to a user who can review the first step and provide an input. The input from the user can include an approval for the execution of the first step (e.g., based on the first set of operating parameters and/or the first set of constraints). Alternately, the user can change one or more of the first set of operating parameters/first set of constraints in the first step (e.g., via a GUI in the controller 204, computing device 206, etc.). The user input can be received (e.g., by the controller 204), and the first control signal can be generated based on the user input (e.g., based on the first set of operating parameter, based on revised operating parameters provided by the user, etc.).

The inspection device can receive the first control signal and perform inspection of the first node based on the first control signal. The first control signal can include the location of the first node. One or more motors in the inspection device can vary the position/orientation of the inspection device (or a portion thereof) to allow for inspection of the first node. For example, a head section of the inspection device can be positioned adjacent to the first node (e.g., by translation/rotation of the head section). The head section can include one or more sensors (e.g., IR camera, visible-light camera, vibration detectors, temperature sensors, etc.), and light sources that can allow for inspection of the first node. Details of an exemplary inspection device (a borescope) are provided below with the description of FIG. 3.

At step 106, data characterizing the inspection measurement of the first node by the inspection device can be received (e.g., by the controller 204). This can include inspection data generated by the various sensors in the inspection device (e.g., inspection device 202, head section of borescope 300 described in FIG. 3, etc.). For example, the inspection device can include a visible-light/IR camera that can capture visible-light images, IR images, 3D images, videos, or environmental information such as thermal information, linear or rotational movement, magnetic field information, etc. of the first node. Data characterizing the captured images can be transmitted by the inspection device 202, and can be received by the controller 204.

At step 108, one or more characteristics of the received data characterizing the inspection measurement of the first node can be determined (e.g., by a first analytical model). In some implementations, the determined characteristics can include one or more site features (e.g., defects) in the first node that can be identified from the received data characterizing the inspection measurement. For example, the inspection device can capture an image of the first node, and the image data can be transmitted (e.g., to controller 204). The controller can execute an analytical model (e.g., an image recognition algorithm) that can determine the presence of a node site feature (e.g., an anomaly of a defect at the first node) from the image of the first node. The analytical model can also identify the site feature (e.g., "defect type"). For example, the defect can be identified as one of a crack, tear, rub, dent, coating loss, missing material, erosion, excess material, a fissure, or a combination thereof.

In some implementations, the analytical model can be based on the first set of constraints. For example, the analytical model may be pre-trained by machine learning processes using pre-existing training images that include defects that are defined by predetermined constraints (e.g., the first set of constraints). In some implementations, the determined characteristic can include the surrounding (or environment) of the first node. For example, the first node can be located on/adjacent to a machine part (e.g., a turbine). The determined characteristic can be the identity of the machine part(s) that can be determined by the analytical model. In some implementations, the determined characteristic can include image acquisition parameters associated with the inspection measurement of the first node (e.g., lighting, sharpness, brightness, dirty lenses, overly-oblique angles, vibration/motion, etc.).

The determined characteristic (e.g., defect type, surrounding, etc.) can be compared with one or more of the first set of constraints included in the first step of the received inspection plan. For example, the identified defect type can be compared with constraint defect type in the first set of constraints. Additionally or alternately, the identified surrounding (or environment) can be compared with the constraint surrounding in the first set of constraints. The first set of constraints can be indicative of expected characteristics of the first node. For example, if the first node is located on a blade of a turbine, the constraint defect type can be indicative of a defect (e.g., a crack) commonly (or historically) found on a blade. If the first node is expected to be located in a certain portion of the machine, the constraint surrounding can be indicative of one or more machine parts located in that portion of that machine. For example, white-colored thermal barrier coating may be expected to be present on the blades in a high pressure turbine section of a turbine engine.

A next operation of the inspection device can be based on correlation between the determined one or more characteristics and the first set of constraints. The correlation can be indicative of how similar the determined characteristics are to the first set of constraints. For example, the first set of constraints can include image acquisition parameters (e.g., brightness, size of the site feature/defect in the image of the first node, etc.) associated with the inspection measurement of the first node. If the corresponding characteristics obtained from the inspection measurement data are within a predetermined range from the image acquisition parameter, the characteristic of the received measurement data can be considered to correlate with the first set of constraints. In some implementations, the first set of constraints can indicate a type of defect. The analytical model can determine that the site feature is a defect and can assign a characteristic identifier that can indicate the defect type. If the characteristic identifier is similar to a constraint characteristic identifier in the first set of constraints, the received measurement data can be considered to correlate with the first set of constraints.

The next operation can include performing a new inspection of the first node (e.g., when the determined characteristic is not compliant with the first set of constraints). For example, if the detected defect type does not match the constraint defect type (or one of multiple constraint defect types) in the first set of constraints, it may be desirable to perform a new measurement (e.g., repeat the first step of the inspection plan). In another example, if the detected surrounding does not match the constraint surrounding in the first set of constraint, it may be desirable to perform a new inspection of the first node. The new inspection can be based on an updated set of operating parameters that can be provided by a user, or determined by the analytical model.

Alternately, the next operation of the inspection device can include performing a second step of the inspection plan. This can be done, for example, when the determined characteristic(s) is compliant with the first set of constraint. This can indicate that the inspection of the first node has been performed as desired (e.g., performed with a predetermined degree of accuracy), and the inspection of the inspection site can proceed based on the inspection plan. Alternately, the user can provide an input (e.g., via the GUI in the controller 204, computing device 206, etc.) instructing the performance of the second step of the inspection plan (e.g., even when the determined characteristic(s) are not compliant with the first set of constraints).

In some implementations, a notification including the determined next operation of the inspection device can be generated. The notification can include an indication (e.g., a message) that the inspection of the first node is successfully completed (e.g., when the determined characteristics of inspection measurement are compliant with the first set of constraints). In some implementations, the notification can include an inspection summary that can include the characteristics determined at step 108, the operating parameters and/or the operating constraints (e.g., first set of operating parameters/constraints) included in the inspection plan. The notification can be provided to an operator/user. This can be done, for example, via a GUI display space in a computing device (e.g., a laptop, a tablet, computing device 206, controller 204, etc.). The notification can provide an option to the user to save one or more of the inspection data of the first node, operating parameters/constraints of the inspection device associated with the inspection of the first node, and additional notes. Upon receiving instructions from the user, a data file including the aforementioned data can be generated and saved (e.g., in a database in controller 204, computing device 206, cloud database, etc.). The generated data file can be linked to the first node (e.g., as an icon with an indication of the first node), and can be provided to a user during the inspection. For example, the data file can be presented as an icon in the GUI display space. The user can access the data file by clicking on the icon.

The notification may indicate that the inspection of the first node has not been successfully completed (e.g., when the determined characteristics of inspection measurement are not compliant with the first set of constraints). The notification may identify the characteristic that did not comply with the constraints (e.g., an unexpected defect type is detected, an unexpected surrounding is detected, etc.). Additionally or alternately, the notification can include recommendations for successfully completing the inspection of the first node (e.g., recommendations for operating parameters of the inspection device for a new inspection of the first node). If the image of the first node is undesirable, the notification can include recommendations for settings of the camera(s)/lighting devices. For example, the recommendations can include moving the camera towards the first node (or zooming in the camera) and/or capturing the image of the first node from a different location/orientation relative to the first node. This notification can be generated when the image recognition algorithm in the first analytical model determines that the image does not have sufficient resolution, when a larger image of the first node is desirable, when an aspect of a defect in the first node is not clearly visible, etc. The notification can include moving the camera away from the first node (or zooming out the camera). This notification can be generated, for example, when the image recognition algorithm determines that the entire image of a defect in the first node is not captured. The notification can include recommendations for changing the position/orientation of lighting devices in the inspection device (e.g., when a defect is not sufficiently illuminated).

The notification can be presented via an interactive GUI display space in a user device (e.g., controller 204, computing device 206) that can allow for both presenting notifications to a user and receiving user input. For example, a notification message indicating successful/unsuccessful completion of the first step of the inspection plan can be displayed. Additionally or alternately, inspection measurement characteristics that did not comply with the first set of constraints and/or recommendations for operating parameters of the inspection device (e.g., for performing a new inspection of the first node) can be presented. The GUI display space can allow the user to provide one or more inputs. For example, the user can approve proceeding to a second step of the inspection plan for inspecting a second node in the inspection site (e.g., after the notification indicating successful completion of the first step is presented in the GUI). The user can provide operative parameter values for the operation of the inspection device (e.g., for performing a new inspection of the first node).

In some implementations, an updated set of operating parameters for the inspection device can be determined (e.g., by controller 204). The updated set of operating parameters can be associated with a new inspection of the first node. The updated set of operating parameters can be determined based on comparison between the determined characteristic of the received data (e.g., determined defect type) and the first set of constraints. The updated set of operating parameters can include an updated position/orientation/focusing parameters of the camera, position/orientation of lighting device, etc. In one implementation, the updated set of operating parameters can be determined as a part of the notification generation process described above (e.g., notification that includes recommendations for operating parameters of a new inspection).

A second control signal can be generated (e.g., by the controller 204) that can instruct the inspection device to execute the next operation. The second control signal can instruct the inspection device to execute the second step of the inspection plan for the inspection of the second node (e.g., when it is determined the first step is successfully completed). Alternately, the second control signal can instruct the inspection device to perform a new inspection of the first node (e.g., based on input provided by the user, updated operating parameters, etc.).

The steps 102-108 can be repeated for the various nodes of the inspection site. In some implementations, different analytical models can be used for analyzing the inspection data associated with the various nodes. In some implementations, given analytical models can be used for analyzing the inspection data associated with multiple nodes. For example, a first analytical model can be associated with the first node, and a second analytical model can be associated with the second node. The one or more analytical models (e.g., first/second analytical models) can be included in the inspection plan. The analytical models can be trained prior to the deployment of the inspection plan by a training model. The training can be based on training data that can include historical data associated with the various nodes. The first analytical model can be trained (e.g., machine trained) on historical data (e.g., historical inspection measurement, operating parameters, constraints, etc.) associated with the first node (or nodes that are similar to the first node). For example, if the first node is located on a motor in a given turbine, the training data can include historical data associated with motors of the same or similar turbines. Additionally or alternately, the analytical models can be trained during the execution of the inspection plan (e.g., in real-time). For example, the analytical model can be trained based on inspection data acquired during the implementation of the inspection plan, operating parameters/constraints in the inspection plan, etc.

Figure 3:
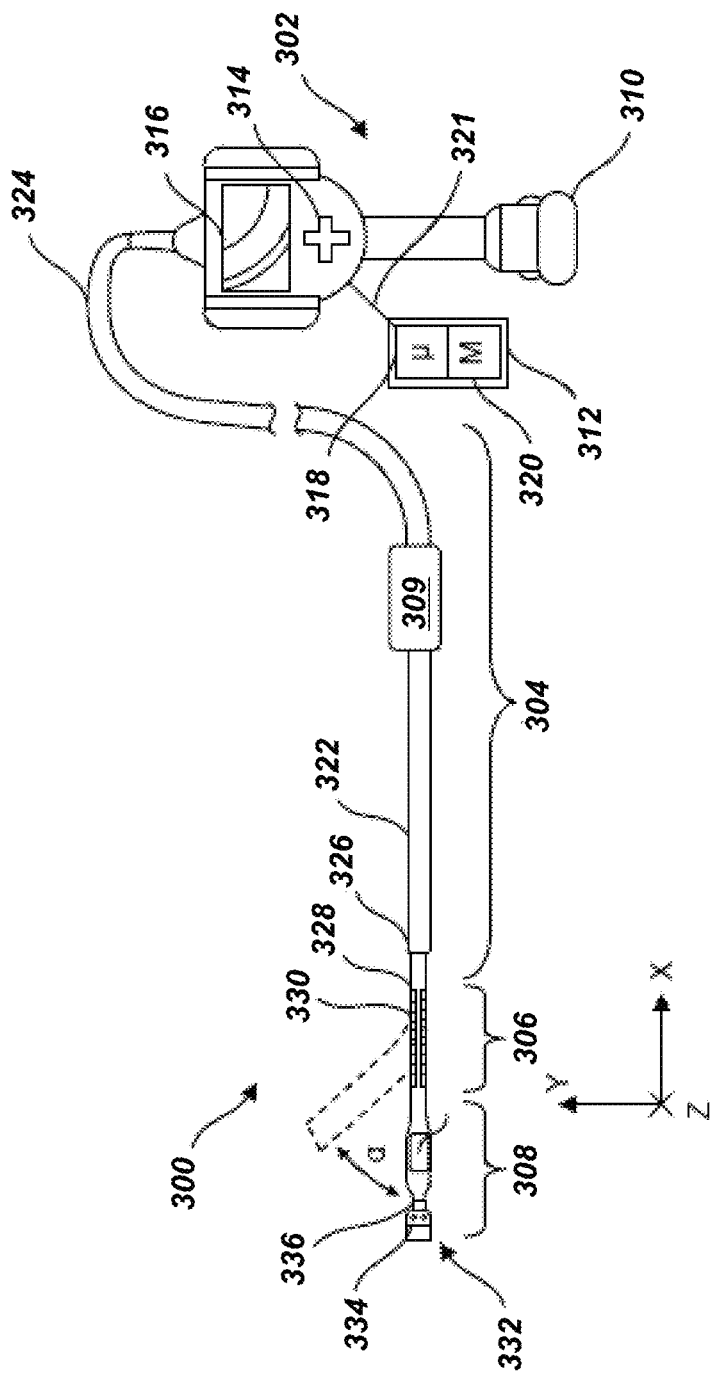
FIG. 3 illustrates a diagram illustrating an exemplary embodiment of a nondestructive testing (NDT) device.

FIG. 3 is a diagram illustrating an exemplary embodiment of an inspection device (e.g., a non-destructive device) in the form of a borescope 300. The borescope 300 can include a control unit 302 (or controller 204), a conduit section 304, a bendable articulation section 306, and a head section 308. In one embodiment, the sections 304, 306, 308 can have different lengths and can be integral with one another, or can be detachable from one another. As depicted, the conduit section 304 is suitable for insertion into a variety of different targets, such as inside turbomachinery, equipment, pipes, conduits, underwater locations, curves, bends, inside or outside of an aircraft system, and the like.

The borescope 300 can include a probe driver 309 coupled to the conduit section 304. The probe driver 309 can include a motor (not shown) configured to translate and/or rotate one or more of the sections 304, 306, 308 (e.g., to facilitate insertion of the probe head 308 into the target). Additionally or alternatively, orientation/position of a portion of the head section 308 (e.g., camera, light source, etc.) can be varied to acquire an inspection region image (e.g., RGB image, IR image, etc.). The control unit 302 can include a control unit housing 310, a controller 312, a directional input 314, and a screen 316. The controller 312 can include a processor 318 and a readable memory 320 containing computer readable instructions which can be executed by the processor 318 in order to actuate the borescope 300. The computer readable instructions can include an inspection plan based on which the borescope 300 or a portion thereof (e.g., a conduit section 304, a bendable articulation section 306, and a head section 308) can be translated/rotated (e.g., by the probe driver 309). In some implementations, the operation of the probe driver 309 can be based on a control signal (e.g., generated by the controller 204 based on the inspection plan/user input via GUI display space on screen 316 or a computing device, etc.).

The controller 312 can be communicatively coupled to the control unit 302 via one or more signals 321. The controller 312 can also be arranged within the control unit housing 310, or can be arranged outside the control unit housing 310. On some implementations, the directional input 314 can be configured to receive user input (e.g., direction controls) to the control unit 302 for actuation of the borescope 300. The screen 316 can display visual information being received by the camera (comprising an optical sensor) arranged in the head section 308, which can allow the user to better guide the borescope 300 using the directional input 314. The directional input 314 and the screen 316 can be communicatively coupled to the controller 312 via the one or more signals 321, which can be a hard-wired connection or a wireless signal, such as WI-FI or Bluetooth. In one implementation, inspection data and/or notifications (e.g., notifications based on inspection data as described above) can be provided on the screen 316.

The conduit section 304 can include a tubular housing 322 including a proximal end 324 and a distal end 326. The tubular housing 322 can be a flexible member along its whole length, or can be rigid at the proximal end 324 and become more flexible travelling down the length of the conduit section 304 towards the distal end 326. In certain embodiments, the tubular housing 322 can be formed from a non-porous material to prevent contaminants from entering the borescope 300 via the conduit section 304.

The control unit 302 can be arranged at the proximal end 324 of the tubular housing 322, and the bendable articulation section 306 can be arranged at the distal end of the tubular housing 322. The bendable articulation section 306 can include a bendable neck 328 and washers 330. The bendable neck 328 can be arranged at the distal end 326 of the tubular housing 322, and is able to be actuated 360° in the Y-Z plane. The bendable neck 328 can be wrapped in a non-porous material to prevent contaminants from entering the borescope 300 via the bendable articulation section 306.

The head section 308 can include a head assembly 332. The head assembly 332 can include one or more light source 334 (e.g., LEDs or a fiber optic bundle with lights at the proximal end), a camera 336 (or multiple cameras such as visible-light camera, IR camera, etc.), and one or more sensors 338 that can be configured to collect data about the surrounding environment. The camera 336 of the borescope 300 can provide images and video suitable for inspection to the screen 316 of the control unit 302. The light source 334 can be used to provide for illumination when the head section 308 is disposed in locations having low light or no light. The sensor 338 can record data including temperature data, distance data, clearance data (e.g., distance between a rotating element and a stationary element), flow data, and so on.

In certain embodiments, the borescope 300 includes a plurality of replacement head assemblies 332. The head assemblies 332 can include tips having differing optical characteristics, such as focal length, stereoscopic views, 3-dimensional (3D) phase views, shadow views, etc. Additionally or alternatively, the head section 308 can include a removable and replaceable portion of the head section 308. Accordingly, a plurality of the head sections 308, bendable necks 328, and conduit section 304 can be provided at a variety of diameters from approximately one millimeter to ten millimeters or more.

During use, the bendable articulation section 306 and the probe driver 309 can be controlled, for example, by the control inputs (e.g., relative control gestures, physical manipulation device) from the directional input 314 and/or control signals generated by the controller 312. The directional input can be a joystick, D-pad, touch pad, trackball, optical sensor, or a touchscreen over the screen 316. The directional input 314 can also be a similar device that is located outside the control unit housing 310 and connected by wire or wireless means. In particular, a set of control inputs can be used to control the bendable articulation section 306 and/or the probe driver 309. The bendable articulation section 306 can steer or "bend" in various dimensions, while the conduit section 304 can translate and/or rotate, using any combination of actuators and wires arranged within the control unit 302, to adjust the orientation (e.g., a positioning) of the head section 308. In some implementations, the control inputs/direction input 314 can be generated by the controller based on the inspection plan.

The actuators can be electric, pneumatic, or ultrasonically operated motors or solenoids, shape alloy, electroactive polymers, dielectric elastomers, polymer muscle material, or other materials. For example, the bendable articulation section 306 and the probe driver 309 can enable movement of the head section 308 in an X-Y plane, X-Z plane, and/or Y-Z plane. Indeed, the directional input 314 can be used to perform control actions suitable for disposing the head section 308 at a variety of angles, such as the depicted angle α. In this manner, the head section 308 can be positioned to visually inspect desired locations.

Once the head section 308 is in a desired position, the camera 336 can operate to acquire, for example, a stand-still visual image or a continuous visual image, which can be displayed on the screen 316 of the control unit 302, and can be recorded by the borescope 300. In embodiments, the screen 316 can be multi-touch touch screens using capacitance techniques, resistive techniques, infrared grid techniques, and the like, to detect the touch of a stylus and/or one or more human fingers. Additionally or alternatively, acquired visual images can be transmitted into a separate storage device for later reference.

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a Read-Only Memory or a Random Access Memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web interface through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

What is claimed is:

1. A method comprising:
   receiving data characterizing an inspection plan associated with an inspection of one or more nodes in an inspection site by an inspection device, wherein the inspection site comprises an industrial device and a first step of the inspection plan comprises a first set of operating parameters of the inspection device associated with the inspection of a first node of the one or more nodes and a first set of constraints associated with one or more inspection criteria at the first node by the inspection device;
   generating a first control signal configured to instruct the inspection device to inspect the first node of the one or more nodes, wherein the first control signal is based on one or more of the first set of operating parameters defining a position of the inspection device relative to the first node of the industrial device during inspection of the first node;
   receiving data, collected during the inspection of the first node, the data characterizing an inspection measurement of the first node by the inspection device; and
   determining, by a first analytical model, one or more characteristics of the data characterizing the inspection measurement of the first node, wherein the first analytical model comprises an image recognition algorithm that extracts the one or more characteristics from images included in the data;
   comparing the one or more characteristics extracted from the images included in the data with existing training images to determine a correlation between the one or more characteristics of the data with the first set of constraints indicative of a defect of the first node of the industrial device visible from the position of the inspection device relative to the first node; and
   generating a next operation of the inspection device based on the correlation between the one or more characteristics of the data with the first set of constraints to analyze the defect of the first node of the industrial device.

2. The method of claim 1, wherein determining one or more characteristics comprises identifying one or more of a site feature in the first node, a surrounding region associated with the first node, a machine part of the inspection site where the first node is located, and image acquisition parameters associated with the inspection measurement of the first node.

3. The method of claim 2, further comprising:
   determining a defect type associated with the site feature;
   comparing the defect type with a constraint defect type in the first set of constraints to generate a comparison result; and
   determining the next operation of the inspection device based on the comparison result.

4. The method of claim 3, further comprising:
   generating a notification comprising the next operation, wherein the notification comprises one or more of an indication that the inspection of the first node is successfully completed or repeating inspection of the first node, and an inspection summary, the inspection summary comprising one or more of the one or more characteristics, the first set of operating parameters and the first set of constraints.

5. The method of claim 4, further comprising:
   determining, an updated set of operating parameters for the inspection device associated with the inspection of the first node, the determining based on comparing the defect type and the constraint defect type.

6. The method of claim 5, further comprising generating a second control signal based on the updated set of operating parameters, wherein the next operation of the inspection device is based on the second control signal.

7. The method of claim 4, further comprising:
   presenting the notification to a user;
   receiving an input from the user in response to the notification; and
   generating a second control signal based on the input, wherein the next operation of the inspection device is based on the second control signal.

8. The method of claim 7, wherein the next operation of the inspection device comprises execution of a second step of the inspection plan that comprises a second set of operating parameters of the inspection device associated with the inspection of a second node of the one or more nodes and a second set of constraints associated with an inspection measurement at the second node by the inspection device.

9. The method of claim 8, further comprising:
   receiving data characterizing the inspection measurement of the second node by the inspection device; and
   determining, by one of the first analytical model and a second analytical model, one or more characteristics of the data characterizing the inspection measurement of the second node, wherein the next operation of the inspection device is based on correlation between the determined one or more characteristics of the data and the second set of constraints.

10. The method of claim 9, wherein the first analytic model and the second analytic model are included in the inspection plan.

11. The method of claim 8, wherein the first analytic model is trained during a training performed prior to the inspection, the training comprising:
    receiving training data associated with the first analytical model, the training data comprising historical inputs and outputs of the first analytical model; and
    training, by a training model, the first analytical model based on one or more of the training data, data characterizing the inspection measurement and the inspection plan.

12. The method of claim 2, further comprising generating a data file comprising one or more of information associated with the site feature in the first node, the first analytical model, data characterizing the inspection of the first node and the first set of operating parameters.

13. The method of claim 1, further comprising:
presenting the first step of the inspection plan to a user;
receiving user input from a user, wherein the first control signal is generated based on the user input.

14. The method of claim 1, wherein the first control signal is generated based on the first set of operating parameters in the first step of the inspection plan.

15. The method of claim 1, wherein the determined one or more characteristics comprises a surrounding region associated with the first node.

16. The method of claim 1, wherein the first analytical model can be based on the first set of constraints.

17. A system comprising:
at least one data processor;
a memory coupled to the at least one data processor, the memory storing instructions to cause the at least one data processor to perform operations comprising:
receiving data characterizing an inspection plan associated with an inspection of one or more nodes in an inspection site by an inspection device, wherein the inspection site comprises an industrial device and a first step of the inspection plan comprises a first set of operating parameters of the inspection device associated with the inspection of a first node of the one or more nodes and a first set of constraints associated with one or more inspection criteria at the first node by the inspection device;
generating a first control signal configured to instruct the inspection device to inspect the first node of the one or more nodes, wherein the first control signal is based on one or more of the first set of operating parameters defining a position of the inspection device relative to the first node of the industrial device during inspection of the first node;
receiving data, collected during the inspection of the first node, the data characterizing an inspection measurement of the first node by the inspection device; and
determining, by a first analytical model, one or more characteristics of the data characterizing the inspection measurement of the first node, wherein the first analytical model comprises an image recognition algorithm that extracts the one or more characteristics from images included in the data;
comparing the one or more characteristics extracted from the images included in the data with existing training images to determine a correlation between the one or more characteristics of the data with the first set of constraints indicative of a defect of the first node of the industrial device visible from the position of the inspection device relative to the first node; and
generating a next operation of the inspection device based on the correlation between the one or more characteristics of the data with the first set of constraints to analyze the defect of the first node of the industrial device.

18. The system of claim 17, wherein determining one or more characteristics comprises identifying one or more of a site feature in the first node, a surrounding region associated with the first node, a machine part of the inspection site where the first node is located, and image acquisition parameters associated with the inspection measurement of the first node.

19. The system of claim 18, wherein the operations further include comprise:
determining a defect type associated with the site feature;
comparing the defect type with a constraint defect type in the first set of constraints to generate a comparison result; and
determining the next operation of the inspection device based on the comparison result.

20. A computer program product comprising a non-transitory machine-readable medium storing instructions that, when executed by at least one programmable processor that comprises at least one physical core and a plurality of logical cores, cause the at least one programmable processor to perform operations comprising:
receiving data characterizing an inspection plan associated with an inspection of one or more nodes in an inspection site by an inspection device, wherein the inspection site comprises an industrial device and a first step of the inspection plan comprises a first set of operating parameters of the inspection device associated with the inspection of a first node of the one or more nodes and a first set of constraints associated with one or more inspection criteria at the first node by the inspection device;
generating a first control signal configured to instruct the inspection device to inspect the first node of the one or more nodes, wherein the first control signal is based on one or more of the first set of operating parameters defining a position of the inspection device relative to the first node of the industrial device during inspection of the first node;
receiving data, collected during the inspection of the first node, the data characterizing an inspection measurement of the first node by the inspection device; and
determining, by a first analytical model, one or more characteristics of the data characterizing the inspection measurement of the first node, wherein the first analytical model comprises an image recognition algorithm that extracts the one or more characteristics from images included in the data;
comparing the one or more characteristics extracted from the images included in the data with existing training images to determine a correlation between the one or more characteristics of the data with the first set of constraints indicative of a defect of the first node of the industrial device visible from the position of the inspection device relative to the first node; and
generating a next operation of the inspection device based on the correlation between the one or more characteristics of the data with the first set of constraints to analyze the defect of the first node of the industrial device.

* * * * *